Feb. 24, 1959　　　A. W. MUSGRAVE　　　2,874,473
APPARATUS FOR DESCRIBING HOMOTHETIC GEOMETRICAL FIGURES
Filed Feb. 11, 1953　　　　　　　　　　6 Sheets-Sheet 3
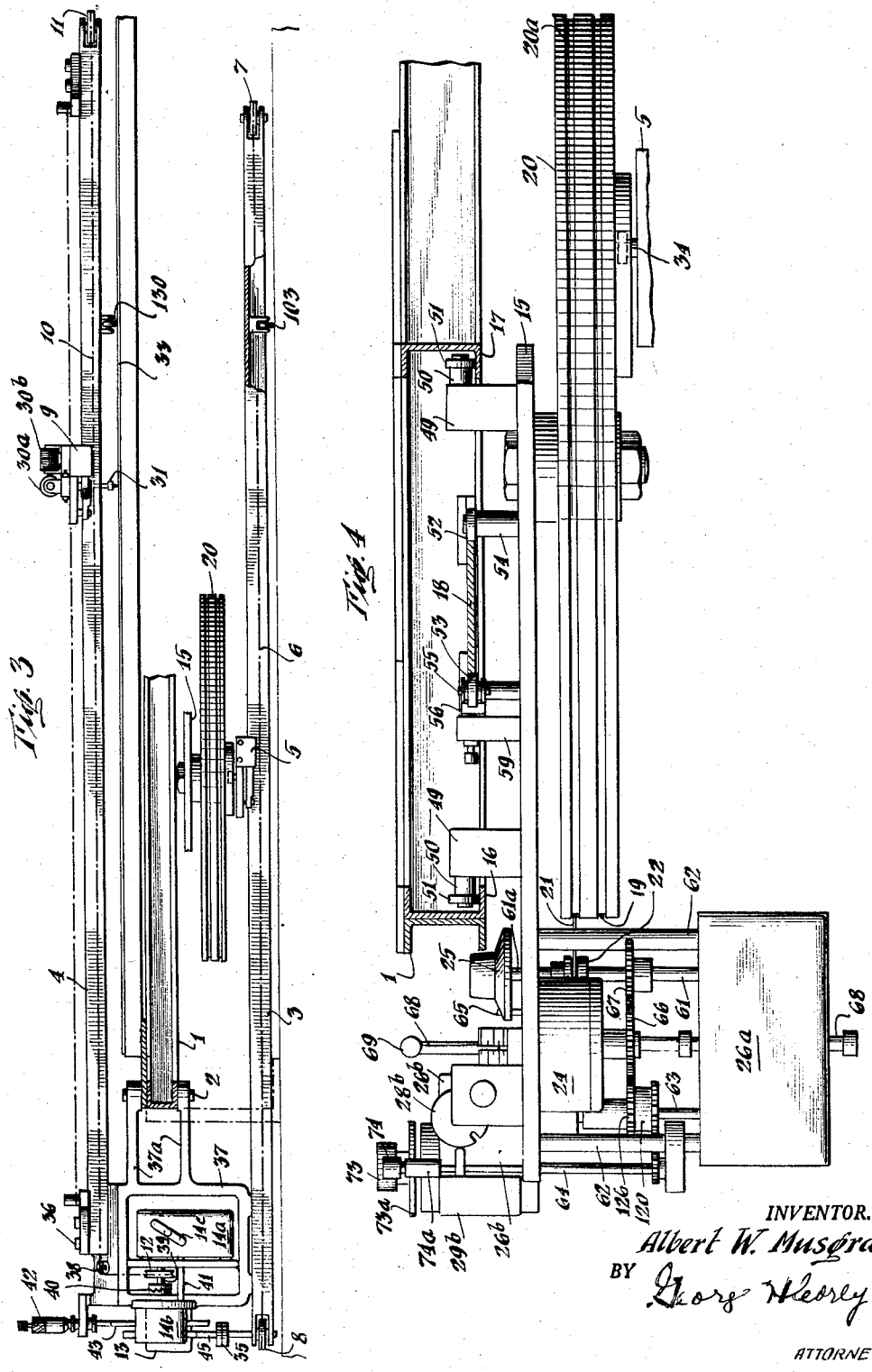
INVENTOR.
Albert W. Musgrave
BY George Heorly
ATTORNEY Feb. 24, 1959  A. W. MUSGRAVE  2,874,473
APPARATUS FOR DESCRIBING HOMOTHETIC GEOMETRICAL FIGURES
Filed Feb. 11, 1953  6 Sheets-Sheet 4
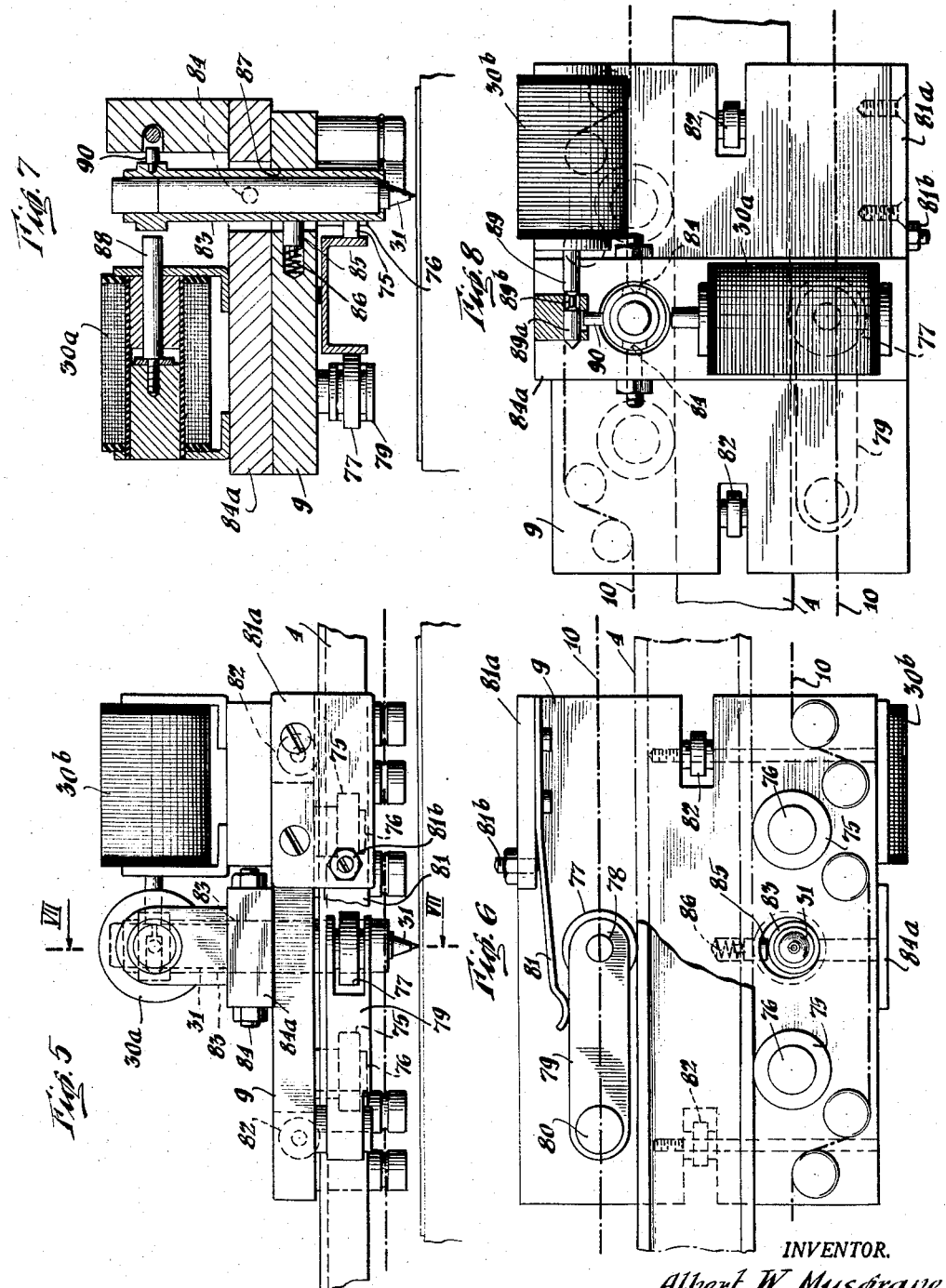
INVENTOR.
Albert W. Musgrave
BY
George W. Corey
ATTORNEY

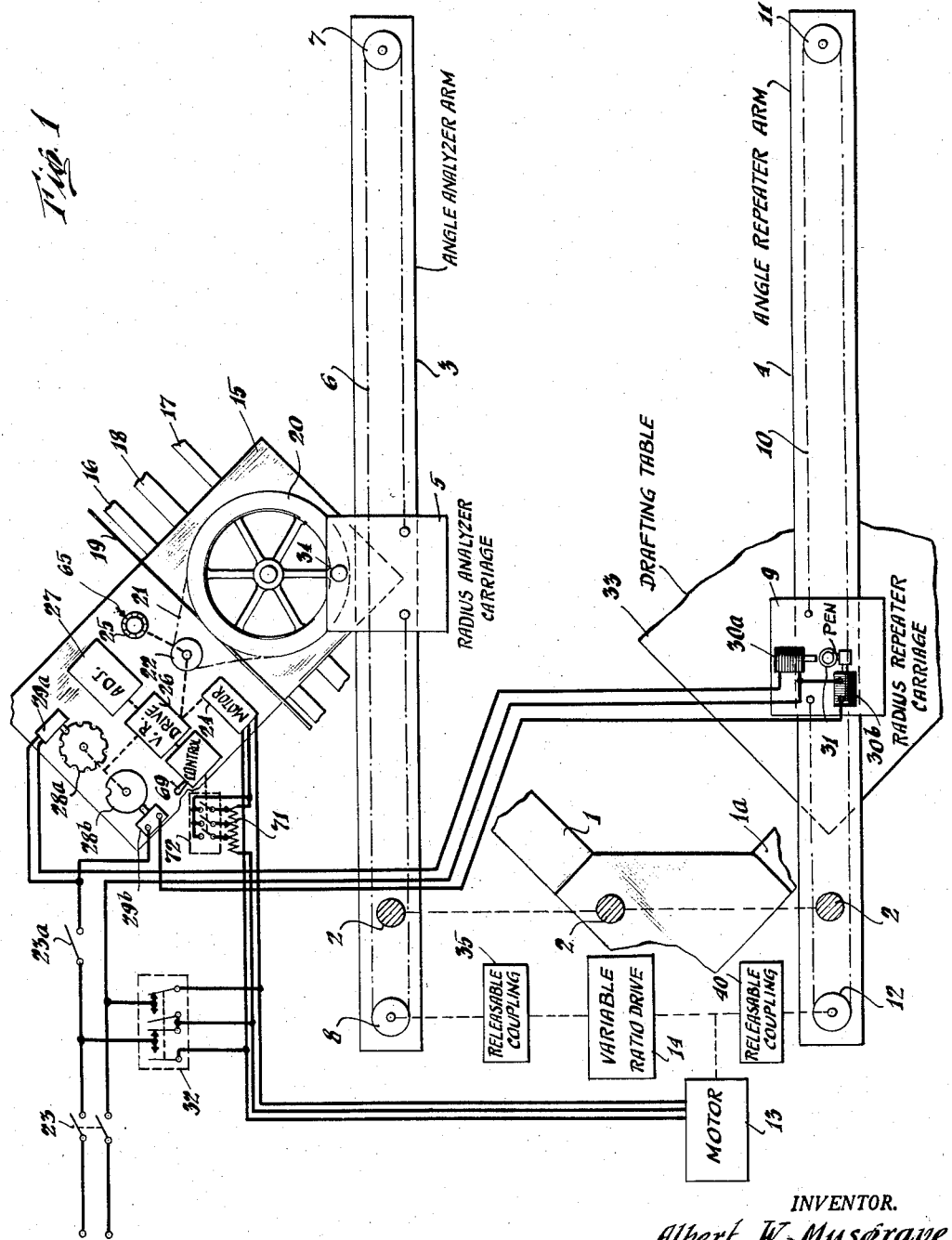

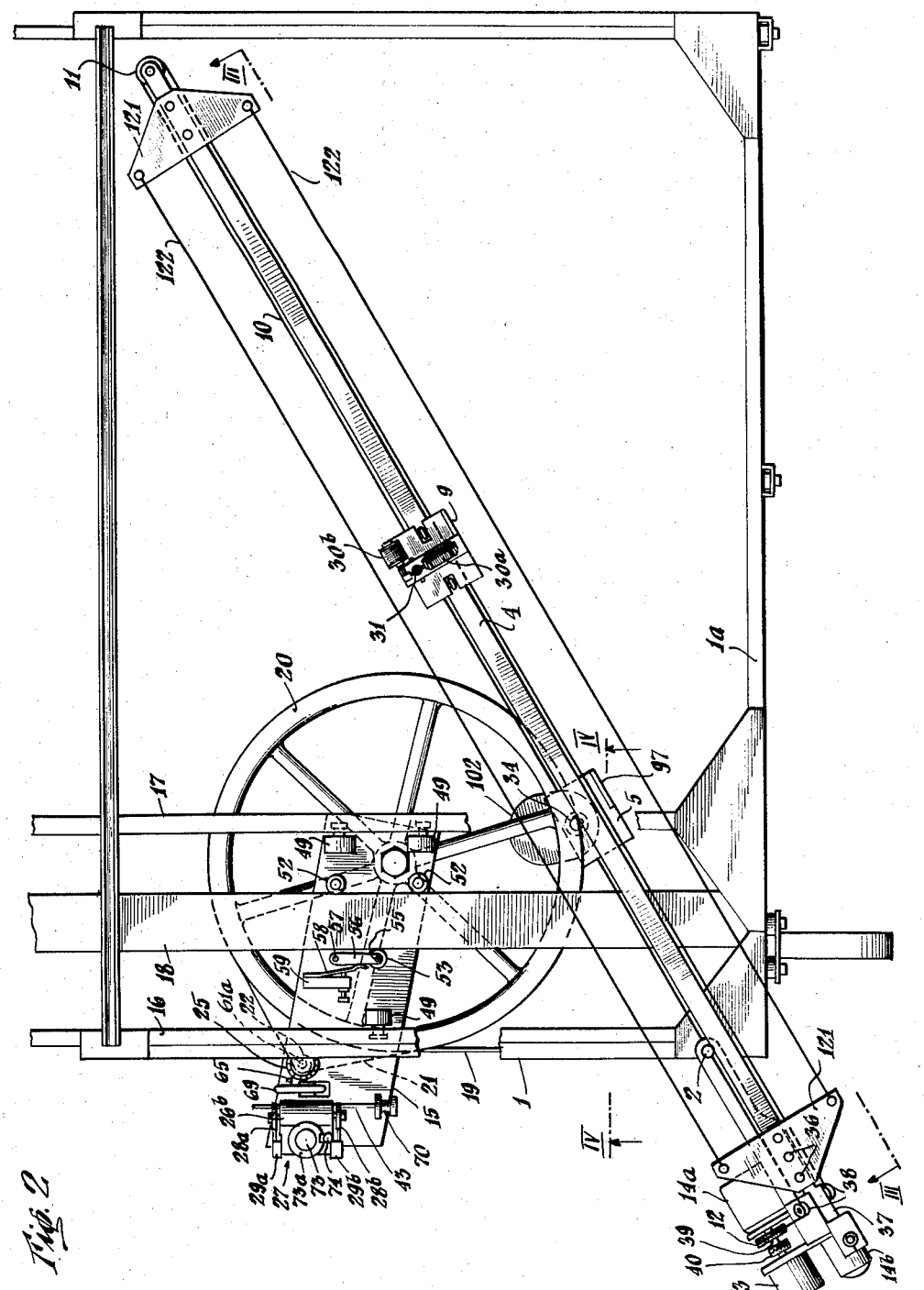

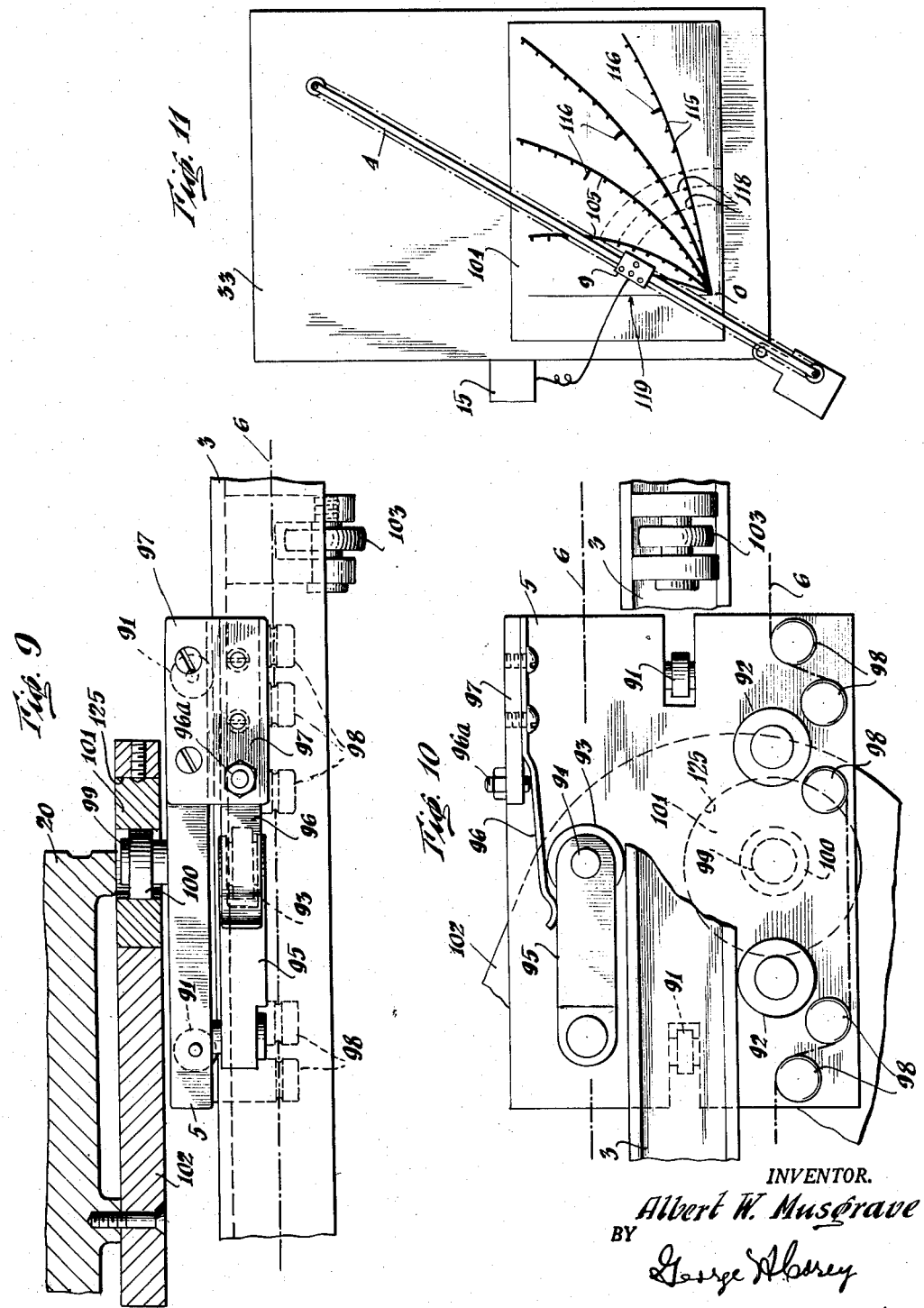

Feb. 24, 1959  A. W. MUSGRAVE  2,874,473
APPARATUS FOR DESCRIBING HOMOTHETIC GEOMETRICAL FIGURES
Filed Feb. 11, 1953  6 Sheets-Sheet 6
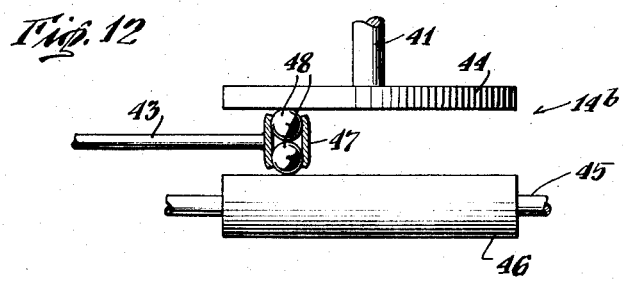
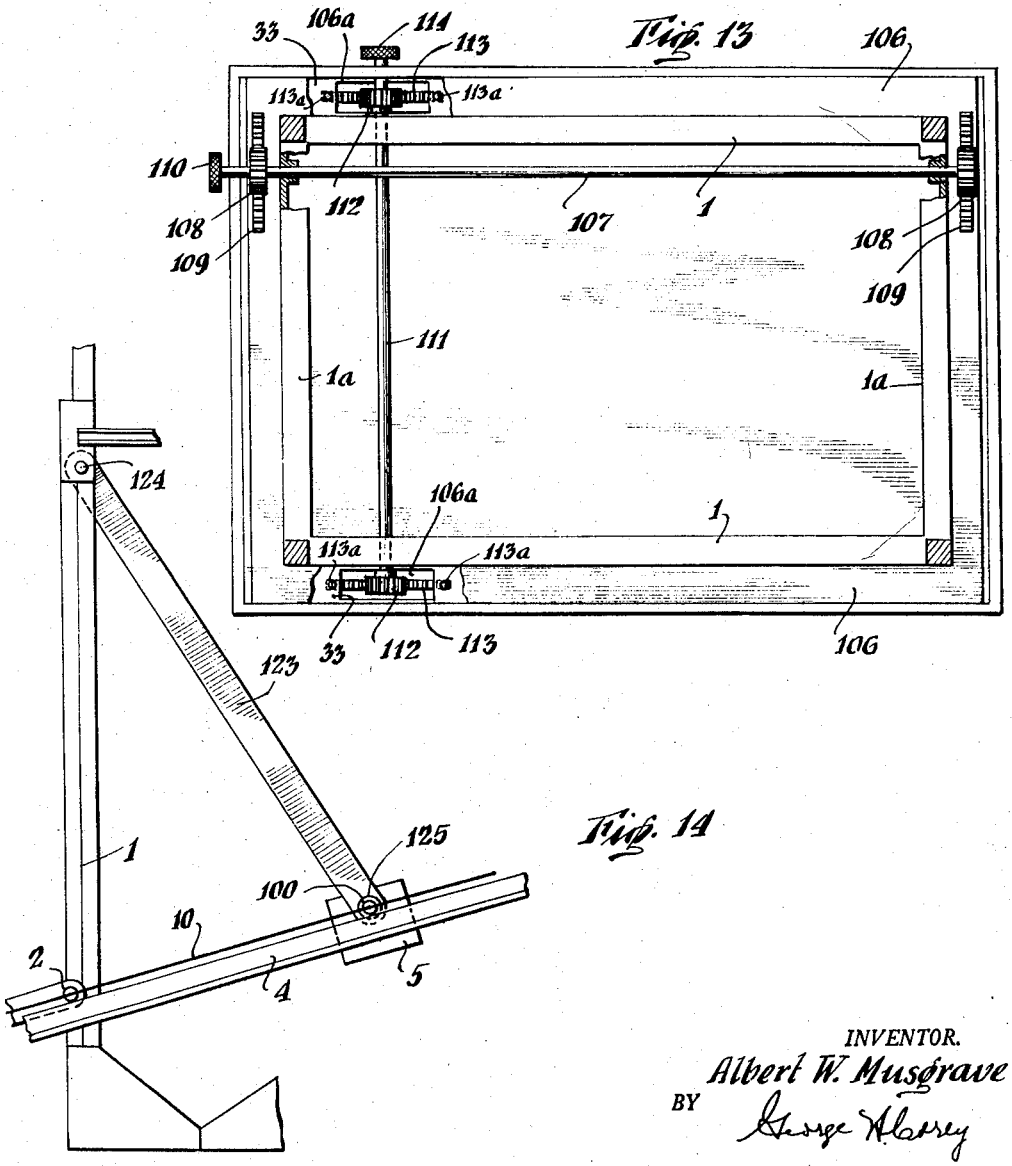
INVENTOR.
Albert W. Musgrave
BY George H. Carey
ATTORNEY United States Patent Office
2,874,473
Patented Feb. 24, 1959

2,874,473

APPARATUS FOR DESCRIBING HOMOTHETIC GEOMETRICAL FIGURES

Albert W. Musgrave, Monahans, Tex.

Application February 11, 1953, Serial No. 336,425

12 Claims. (Cl. 33—24)

This invention relates to apparatus for describing homothetic geometrical figures. It particularly relates to apparatus for plotting charts of a type used as computing aids in seismographic prospecting, commonly called "wave-front charts."

Seismographic prospecting is usually carried out by placing a number of sensitive seismographic recording instruments at spaced points along the surface of the ground, setting off an explosion at a suitable location near the instruments and analyzing the records produced by the instruments. Usually the instruments are spaced along straight lines which cross at the "shot point." The shot point is a point usually in a shallow hole in which the explosive charge is set off to produce the seismographic record. The vibrations of the ground set up by the explosion radiate from the shot point as waves which for the purposes of the present discussion may be considered as compression waves although actually waves of several different complex types may be produced by any given explosion. These waves reflect from the interfaces between different geological formations, or from other discontinuous structures, and the reflected waves are sensed by the various seismographic instruments. From the vibration record produced by these instruments it is possible to determine the "reflection time" and the "step-out time" of the reflected waves. The "reflection time" may be defined as the time required for the wave to proceed from the source of the explosion to the reflecting surface and back to the seismograph on which it is recorded, and measures the distance of that surface from the shot point. The "step-out time" is the difference between the reflection times at two spaced seismographic instruments and when properly corrected is a measure of the angle of dip of the reflecting surface.

A wave-front chart is a graphical representation of a cross-section of a portion of the earth taken in a vertical plane passing through the shot point and showing the locations at successive equal time intervals of a wave front radiating outward from the source of an explosion. In order to construct such a chart, it is necessary to know the variation in the velocity of the wave front as it proceeds through the earth. It is common to make an assumption regarding variations of the wave velocity with depth and to prepare the chart on the basis of that assumption. The assumption may be based on data gathered through previous experience in the same or similar locations, or it may be based on an actual measurement made in a well-hole, for example. Once the variation of the wave velocity with depth is known or assumed, a wave-front chart may be drawn.

In plotting a wave-front chart it is common first to draw a family of "raypaths" which are the paths followed by individual infinitesimal sections of the wave front. These raypaths can be drawn as soon as the assumed variation of velocity with depth has been established. Once a family of raypaths is drawn the wave-front can be superimposed on them as a family of orthogonal curves, intersecting the raypaths at spaced points determined by the time interval chosen between successive wave fronts. Where the wave velocity is assumed to vary linearly with depth it is relatively easy to construct a wave-front chart, since the wave fronts and the raypaths are all circular. This assumption regarding variation of velocity with depth does not fit the actual variation encountered in all cases. In many cases the wave velocity varies substantially parabolically with the depth. Where such a variation of velocity with depth is encountered the raypaths are right cycloidal curves and the wave-fronts are complex curves of a type not defined by any commonly accepted term.

A right cycloidal curve is defined as the curve traced by a point on the circumference of a circle which rolls without sliding upon a fixed straight line in the plane of the curve. Any two right cycloidal curves are homothetic in that they differ from one another only by the radii of their generating circles. All circles are similarly homothetic in that they differ from one another only by their respective radii.

A wave-front chart is drawn to take into account all known discontinuities and assumes the existence of a homogenous isotropic medium in all locations where the geologic structure is unknown. By taking such a wave-front chart and comparing the reflection time and step-out time measurements, it is possible to determine the location of reflecting surfaces in the zones which were assumed to be homogenous and isotropic. Since, with a known variation of velocity, every distance along a raypath represents a definite time, it is common to calibrate the wave fronts and raypaths on the wave-front charts in terms of reflection times and step-out times so that, by plotting the measured times on the wave-front charts, a graphic drawing of the location of the reflecting surface is produced.

The problems of seismographic prospecting and particularly the drawing of wave-front charts is further complicated by the presence of a layer at the surface of the earth in which the velocity of wave propagation does not consistently follow the same laws and patterns which it follows in deeper parts of the earth's structure. This layer is commonly termed the "low velocity layer" or the "weathered layer." To avoid the distorting effects of this layer, it is customary to set off the explosive charge as far down in the low velocity layer as possible and preferably below that layer. An average depth of this shot is usually taken as the datum plane to which all times are connected. Wave-front charts are made with the datum plane as their reference line so that the corrected times all over the area may be plotted by means of the chart.

It is an object of the present invention to provide apparatus for describing homothetic figures. A further object is to provide apparatus for drawing families of homothetic curves of the types required for wave-front charts, particularly circles and right cycloids.

Another object of the invention is to provide mechanism for drawing wave-front charts, including means for supporting a record sheet, means for drawing families of homothetic curves on the sheet, and means for shifting the sheet bodily with respect to the curve drawing mechanism.

A further object is to provide, in apparatus for drawing families of right cycloidal curves, means for marking each curve at spaced points separated by equal angles of rotation of the generating circle.

Another object of the invention is to provide power operated driving mechanism for a homothetic figure describing apparatus.

Another object of the invention is to provide improved mechanism for generating a right cycloidal curve including a straightedge, a carriage guided for linear movement by the straightedge and rotatably supporting a wheel, and a traverse cable extending parallel to said straightedge and wrapped around the wheel to produce a rolling movement of the wheel as the carriage moves along the straightedge.

Another object of the invention is to provide improved mechanism for analyzing the polar coordinates of a moving member with respect to a fixed point.

The foregoing and other objects of the invention are attained by providing a follower which moves along a given curve, for example a circle or a cycloid. Analyzing mechanism is provided to determine, from the follower position, the polar coordinates of the successive points on the curve through which the follower moves. This polar coordinate analyzing mechanism includes an angle analyzer and a radius analyzer. The angle analyzer takes the form of an arm swinging on a fixed pivot and the radius analyzer is a carriage guided for movement lengthwise of the swinging arm. The carriage is pivotally connected to the follower, so that the carriage can follow all movements of the follower within a certain range in a given plane.

The apparatus also includes a tool which is to reproduce the desired curve and which is shown as a recording element such as a pen or stylus. An angle repeater arm is provided which swings about a fixed pivot in a manner similar to the angle analyzer arm. A radius repeater carriage is guided for movement lengthwise of the angle repeater arm. The angle analyzer arm and the angle repeater arm are connected for concurrent angular movement at the same angular velocity. The radius analyzer carriage and the radius repeater carriage are connected for concurrent movement lengthwise of their respective arms. The connection between the carriages includes variable ratio driving mechanism for adjusting the ratio between the distances through which the carriages travel concurrently along their respective arms. The tool is mounted on the radius repeater carriage.

When the apparatus is used for drawing circles, the follower is simply a point on the end of a link pivoted for rotation in a plane parallel to the analyzer arm about a fixed center. The end of the link must then necessarily move in a circular path.

When the apparatus is used for describing right cycloids, the follower is a point on the rim of the wheel which rolls along a linear path in the plane parallel to the analyzer arm.

The apparatus is mounted on a generally rectangular framework. Pivotally supported at one corner of the framework is a main casting on which are mounted an upper arm extending over the framework and a lower arm extending under the framework. The cycloid generating mechanism is mounted under the framework. The lower arm corresponds to the angle analyzer arm previously described. The upper arm corresponds to the angle repeater arm previously described.

The cycloid generating mechanism includes a main carriage which rides on rails forming a part of the main frame. A straightedge is mounted transversely of the main frame and guides the movement of this carriage along its rails. A cycloid generating wheel is rotatably mounted on the main carriage. A traverse cable is stretched between the opposite sides of the frame parallel to the straightedge and circumferentially around the cycloid generating wheel, so that the wheel rolls along a straight line represented by the traverse cable as the main carriage moves across the main frame guided by the straightedge.

Also mounted on the main carriage is a cam operated switch. The cam is driven from the cycloid generating wheel so as to actuate the switch each time the wheel turns through a predetermined angle. The driving connection between the wheel and the cam includes a settable variable ratio drive mechanism, so that the angle through which the wheel turns for each actuation of the switch may be adjusted as desired. Means is also provided for adjusting the position of the cam with respect to its drive mechanism to provide a zero adjustment. The switch controls a solenoid mounted on the tool supporting carriage and effective when energized to move the marking stylus or pen a short distance sidewise and back again so as to make a time indicating "pip" along the curve which the pen is tracing.

Under the pen is mounted a table top carrying a sheet on which the curves are drawn. The table top is adjustable in two directions with respect to the main frame, so that the origin of the curve can be shifted over a wide range with respect to the pivot of the main casting.

The foregoing and other objects of the invention will become apparent from the consideration of the following specification and claims, taken together with the accompanying drawings, in which Fig. 1 is a view, partly in plan and partly diagrammatic, illustrating a curve drawing apparatus embodying the invention.

Fig. 2 is a plan view, with certain parts omitted, of apparatus embodying the invention and including cycloid generating mechanism.

Fig. 3 is a view, partly in section and partly in elevation, taken on the line III—III of Fig. 2, with certain parts broken away.

Fig. 4 is a view, partly in section and partly in elevation, taken on the line IV—IV of Fig. 2.

Fig. 5 is a side elevational view of the pen carriage.

Fig. 6 is a bottom view of the pen carriage.

Fig. 7 is a cross-sectional view of the pen carriage taken on the line VII—VII of Fig. 5.

Fig. 8 is a plan view of the pen carriage, with certain parts shown in section.

Fig. 9 is an elevational view of the analyzer carriage, with its connection to the curve generating wheel shown in section.

Fig. 10 is a bottom view of the analyzer carriage of Fig. 9.

Fig. 11 is a somewhat diagrammatic view, illustrating the type of curves which may be drawn with the apparatus of Figs. 1 to 10.

Fig. 12 is a diagrammatic view illustrating continuously variable ratio drive mechanism used in the apparatus of Figs. 1 to 10.

Fig. 13 is a bottom view of the table top, showing the mechanism by which it is shifted relative to the main frame.

Fig. 14 is a fragmentary plan view similar to Fig. 2, showing a modification including circle generating mechanism.

The invention will first be briefly described with reference to the diagrammatic Fig. 1, and the details of construction of the apparatus will then be more completely described with reference to the other figures.

*Fig. 1*

There is shown in this figure one corner of a main frame 1 in which is journaled a shaft 2 extending vertically through the frame. An angle analyzer arm 3 is fixed on the shaft 2 under the frame 1 and a tool or angle repeater arm 4 is fixed on the shaft above the frame 1.

A radius analyzer carriage 5 is mounted on the angle analyzer arm 3 and is guided for a movement lengthwise of that arm. A cable 6 is attached at both its ends to the carriage 5 and extends in both directions therefrom lengthwise of the arm 3 and around pulleys 7 and 8 journaled on the arm at its opposite ends.

A tool supporting or radius repeater carriage 9 is mounted on the tool supporting arm 4 and is guided for movement lengthwise of that arm. A cable 10 is attached at both its ends to the carriage 9 and extends in both directions therefrom lengthwise of the arm 4 and around pulleys 11 and 12 journaled in the arm 4 at its opposite ends.

The pulleys 8 and 12 are driven by a motor 13. The pulley 12 is illustrated as being connected to the motor 13 through releasable coupling 40, whereas the pulley 8 is driven through a variable ratio drive mechanism 14 and another releasable coupling 35. The variable ratio drive mechanism 14 is utilized to adjust the ratio between the speeds of the pulleys 8 and 12.

A main carriage 15 is supported on a pair of rails 16 and 17 which form part of and extend transversely of the main frame 1 between end frame members 1a. Although the main carriage 15 is supported on rails 16 and 17, it is capable of a certain amount of free lateral movement with respect to these rails. Its movement along the rails, however, is guided by a straightedge 18 which extends in the direction between end frame members 1a and is accurately mounted on the main frame 1. A traverse cable 19 at its end is attached to the main frame 1 respectively adjacent end frame member 1a and extends parallel to the straightedge 18, this cable also extending circumferentially in a groove around a cycloid generating wheel 20 which is rotatably mounted on the carriage 15. Another cable 21 also extends in a groove circumferentially around the wheel 20 and over a pulley 22 rotatably mounted on the carriage 15.

As represented by the dotted line, Fig. 1, the pulley 22 is drivingly connected to a dial 25 by transmission means such that the dial 25 rotates through 25 revolutions each time the generating wheel 20 turns one revolution. An index 65 on the carriage 15 cooperates with the dial 25 to indicate the angular position of the wheel 20.

The pulley 22 is connected as in dotted line through a variable ratio drive mechanism 26 having adjusting means 27 to cams 28a and 28b which operate switches 29a and 29b, respectively. These switches are connected respectively in electrical circuits for energizing solenoids 30a and 30b mounted on the tool carriage 9. A pen 31 is mounted on the tool carriage 9 with its point downward and for limited pivotal movement about a horizontal axis extending parallel to the direction of motion of the carriage 9 along the arm 4. Solenoid 30a is effective when energized to move its armature against the pen so as pivotally to move the pen to move its point transversely of the curve which it is drawing and thereby make a small pip on the curve. As more clearly described hereinafter in connection with Figs. 7 and 8, solenoid 30b controls the extent of the lateral movement of the pen 31 effected by the solenoid 30a. When solenoid 30b is deenergized solenoid 30a is effective to move the pin so as to make a relatively small pip but when solenoid 30b is also energized a double length pip is made. The cams 28a and 28b mounted on a common shaft are provided respectively with ten notches and with a single notch so that when the mechanism marks a series of ten pips only the tenth has the double length.

A motor 24 is connected to the variable ratio drive mechanism 26. The motor 24 is electrically energized in parallel with the motor 13. The torque of motor 24 is selected so that it is not sufficient by itself to rotate the wheel 20 and thereby move the carriage 5 and the arms 3 and 4 in the operating positions of these arms and of the wheel. The torque of motor 24 is controlled by a resistance 71 connected in the motor circuit. Different portions of the resistance 71 may be shunted out by a switching mechanism 72 operatively connected to and operated concurrently with the handle 69 of a control which sets the ratio of the variable ratio drive mechanism 26.

Because of the nature of the mechanical connection between the arms 3 and 4 and the wheel 20 at or adjacent certain positions of mechanism on which the arms and the wheel are in "on center" relation, the motor 13 would be under a considerable mechanical disadvantage or would be incapable of effecting movement of the carriage 5 if it alone were required to operate the complete mechanism. However, the two motors 13 and 24 cooperate to drive the complete mechanism. The torque of motor 24 must be limited to a value which will not cause slippage of the pulley 22 or of the wheel 20 on the cable 19 but which is sufficient to carry the wheel over center. This limitation of the torque of motor 24 is accomplished by the resistance 71 and the switching mechanism 72.

The motors 13 and 24 are energized through an electrical circuit including a reversing switch 32 which reverses both motors simultaneously.

A chart supporting table 33 is mounted on the main frame 1 under the pen carriage 9. The table 33 is shiftable both lengthwise and crosswise of the main frame 1 in order to place the curves on the chart with the zero points removed from the pivotal axis of shaft 2 but coincident with each other.

A right cycloidal curve of a certain length is determined by the generating line on which the generating circle rolls, the radius of the generating circle and the initial and final angular positions of the generating point on the rim of the circle with respect to the point of contact between the circle and the line.

In the apparatus illustrated in Fig. 1, the generating line is the traverse cable 19 determined as a straight line by the straightedge 18 guiding the carriage 15. While the radius of the wheel 20 is fixed, it may be shown from the principle of the right cycloid that the effective radius of the generating circle of the cycloidal curve traced by the pen 31 may be adjusted by changing the setting of the variable ratio drive mechanism 14 to change the distance of travel of the pen along arm 4 relative to the distance of travel along arm 3. The initial angular position of the wheel 20, i. e., its position when the pen 31 is at a selected point such as the starting point of the curve, may be adjusted by setting the wheel in the angular position corresponding to the selected point as indicated by the dial 25, then releasing the coupling 40 and moving the pen carriage 9 along the arm 4 until the pen reaches the selected point of the curve which may be indicated by a vertical coordinate of the curve. The adjustable support of the drafting table 33 then may be utilized to set the corresponding horizontal coordinate of the chart under the pen.

When it is desired to trace a curve with the apparatus shown in Fig. 1, the initial angular position of wheel 20 is set as described above and the pen 31 is moved over the desired starting point on the chart mounted on the surface of the table 33. The variable ratio drive mechanism 14 is set to produce the desired relationship between the radius of the generating wheel 20 and the radius of the generating circle of the cycloid curve to be drawn on the chart. The variable ratio drive mechanism 26 is set to determine the interval between the marking of the time pips. Switch 23a is closed. The adjusting mechanism 27 is set so that the switches 29a, 29b are closed to make a time pip mark at the starting point of the curve.

The pen 31 is then lowered into contact with the paper, reversing switch 32 is set in the proper position and the switch 23 is closed to start the motors running. The motor 13 drives the pulley 8 through the variable ratio mechanism 14 and thereby drives the cable 6 to start the carriage 5 moving outwardly along the arm 3. As the carriage moves, it causes the cycloid generating wheel 20 to rotate on its axis, thereby rolling that wheel along the traverse cable 19. The motor 24 assists this movement of the wheel since it also applies a driving torque to the wheel 20. As the wheel 20 rolls along cable 19 it moves the carriage 15 along the rails 16 and 17. The pin 34 fixed in the rim of the wheel 20 and journaled in the carriage 5 generates a cycloidal curve in moving around the periphery of the wheel as the wheel moves along the cable 19.

The angle analyzer arm 3 follows the angular polar coordinate (or direction angle) of the cycloidal curve and the radius analyzer carriage 5 follows the radial polar coordinate (or radius vector) of this curve. Since the arms 4 and 3 move together angularly, the angular position of arm 4 at any time is the same as that of arm 3. The radius vector or radial distance of the tool supporting carriage 9, outwardly from the shaft 2 along the arm 4 differs from the radial distance of the carriage 5 from the shaft 2 along arm 3; the difference depending upon the setting of the variable ratio drive mechanism 14 and upon the initial difference between the radial distances when the pen 31 is at the starting point.

The procedure described above will cause the apparatus to trace one curve approximately of the type shown at 105 in Fig. 11. The shorter time pips are shown at 115 and the longer ones at 116 on the curves of Fig. 11.

In order to draw a family of curves of the type illustrated, the procedure described above is repeated for each curve with the generating wheel 20 set at a different angle at the beginning of each curve and a corresponding new setting of the variable ratio drive 14; the pen being brought to point 0 in Fig. 11 by shifting the table 33 as above mentioned.

The curves 105 represent the raypaths of a wavefront chart for geophysical prospecting. The point 0 represents the source of the explosion or the shot point. The line 119 drawn through this point represents the datum plane. To produce curves representing the wave fronts, the pips 115 and 116 on the respective curves 105 are connected by smooth curves, as shown by the dotted lines 118 in Fig. 11.

*Figs. 2–4*

These figures illustrate the principal structural features of the apparatus shown diagrammatically in Fig. 1. The angular analyzer arm 3 and the tool supporting arm 4 are attached by suitable means such as bolts 36 to a main casting 37, Fig. 3, having a pair of arms 37a secured on the shaft 2 which is pivotally supported in the main frame 1 so as to dispose the arms 3 and 4 respectively below and above the frame 1 and parallel with each other.

The pulley 12 is shown in Figs. 2 and 3 as having its axis horizontal rather than vertical as shown in Fig. 1. The cable 4, connected at its ends to the pen carriage 9 at the lower side as shown in Fig. 2, is guided over the pulley 11 at the end of arm 4 and to the pulley 12 by means of guide pulleys 38 which are rotatably mounted on the casting 37. The pulley 12 is mounted on a shaft 39, Fig. 2, journaled in the casting 37 and connected to the motor 13 through a releasable coupling 40.

The variable ratio drive mechanism 14 of Fig. 1 includes in Figs. 2 and 3 a gear shift 14a which may be of any conventional type, settable in any of several different gear ratios by means of a handle 14c, Fig. 3, and a variable ratio drive mechanism 14b which is shown in more detail in Fig. 12.

The gear shift 14a is drivingly connected to the variable ratio drive mechanism 14b through a shaft 41. The mechanism 14b has an output shaft 45, Fig. 3, connected through the releasable coupling 35 to the pulley 8. The mechanism 14b is also provided with a very fine adjustment including a micrometer 42 by which the position of a vertical rod 43 is adjusted lengthwise thereof. As illustrated in Fig. 12, the shaft 41 drives a disc 44. The output shaft 45 of the mechanism 14b is connected to a cylinder 46 the axis of which extends parallel to a diameter of the disc 44, as in Fig. 12. The rod 43 carries at its end a retainer 47 in which run a pair of balls 48 one of which contacts the disc 44 and the other of which contacts the cylinder 46. The radial distance of the balls 48 from the axis of rotation of the disc 44 determines the turn ratio between the shaft 41 and the shaft 45. This radial distance may be set by the micrometer 42 of Fig. 3.

As illustrated in Figs. 2 and 4, the wheel 20 is mounted below the main carriage 15 instead of being above it as shown in the diagrammatic Fig. 1. Three upstanding blocks 49 are mounted on the carriage 15, two adjacent rail 17 and one adjacent rail 16. Each block 49 supports a horizontal axle 50 on which is journaled a supporting roller 51. The rollers 51 ride on the rails 16 and 17 which are provided by the lower flanges of two channel shaped cross members of the main frame 1. The carriage 15 and all the parts mounted thereon are supported by the rollers 51.

The straightedge 18 is supported at its ends on the end members 1a of the main frame 1 and is disposed between guide rollers 52 and 53 supported on the carriage 15. The two rollers 52 are on one side of the straightedge and are journaled on pins 54 which extend upwardly from and are fixed to the carriage 15. The roller 53 is supported by the carriage 15 on the opposite side of the straightedge and is journaled on an axle 55 carried by an arm 56 pivoted on a pin 57 fixed to the carriage, Fig. 2. A leaf spring 58 adjustably mounted on a bracket 59 supported by the carriage biases the arm 56 to hold the roller 53 in engagement with the straightedge 18. The spring 58 is also effective to keep the rollers 52 in engagement with the straightedge 18 so that the carriage moves along a straight path parallel to the straightedge.

The carriage 15 extends outwardly beyond the main frame 1, Figs. 2 and 4, and is there provided with a number of downwardly extending rods 62 which support at their lower ends a gear shift 26a in the drive between the wheel 20 and the pip marking devices. The drive includes also the variable ratio drive mechanism 26b corresponding to the mechanism 26 of Fig. 1. The cable 21 extends around an upper groove 20a in the wheel 20 and passes over pulley 22 secured on a shaft 61 which extends downwardly into the gear shift 26a and forms an input shaft thereof. The gear shift 26a is also provided with an output shaft 63 geared to the input shaft 64 of the variable ratio drive mechanism 26b which is similar to the mechanism 14b illustrated in Fig. 12. The drive mechanism 26b rotatably drives a pair of cams 28a and 28b carried on a common shaft extending outside the housing of this mechanism, these cams respectively activating switches 29a and 29b, Fig. 2, connected in the circuits of the pen controlling solenoids 30a and 30b in the manner shown in Fig. 1.

The shaft 61 has a part 61a extending above the carriage 15 and carrying a dial device 25 having thereon dial calibrations cooperating with an index 65 supported on the carriage 15. The dial device 25 itself contains a reduction gear such that 25 rotations of the dial thereof corresponds to one rotation of the wheel 20. The point on the dial scale adjacent the index 65 then serves as an indication of the angular position of the wheel 20.

The torque motor 24 is mounted on the under side of the carriage 15 and is connected through gear 66 to shaft 61 by gear 67 or to shaft 63 by gear 126 depending on the position to which the gear 66 is moved to provide the torque where it may be most profitably applied. The selection of the proper shaft and engagement of the proper gear by the gear 66 is accomplished by means of a cam arrangement (not shown) which is connected directly to the control rod 68 which will be referred to again hereinafter. The torque motor 24 applies to the shaft 61 or 63 a torque less than that required to drive either of these shafts and the wheel 20 but sufficient to assist the motor 13 in driving the parts of the mechanism. The motor 13 is sometimes at a considerable mechanical disadvantage with regard to the application of a rotating torque to the wheel 20 and the motor 24 assists the motor 13 to overcome that disadvantage.

The gear shift 26a may be shifted by means of the control rod 68 which extends upwardly through the carriage 15 and is provided at its upper end with a control handle 69. Adjustment of the continuously variable ratio mechanism 26b is accomplished by means of a micrometer 70, Fig. 2, for moving a rod carrying balls as in Fig. 12. The torque of the motor 24 must be controlled in accordance with the position of the gear shift handle 69 to keep the motor torque low enough so that it is not effective by itself to rotate the wheel 20. This is accomplished by moving the rod 68 lengthwise thereof to shift the gear in the gear box 26a and by moving the handle 69 angularly to move the rod upon its axis to shift the gear 66 to one or the other positions thereof referred to above. Such operation of the rod 68 also effects actuation of the switch 72 to change resistance 71, Fig. 1, connected in the circuit of the torque motor. Various portions of the resistance 71 are shunted by the switch mechanism 72 which is operatively connected to the control rod 68 so as to be operated concurrently with the gear shift of Fig. 4.

The adjusting means 27 of Fig. 1 is provided in Figs. 2 and 4 for shifting the angular positions of the shaft carrying cams 28a and 28b with respect to the wheel 20. This adjusting mechanism includes a knob 73 on a shaft connected through a differential gear 120, Fig. 4, to the variable ratio mechanism 26b which drives the cams 28a and 28b, the differential gear providing for this relative movement. When the motors are stationary, the knob 73 can be turned to set the cams 28a and 28b in any desired angular position. A locking knob 74 on a stud threaded in bracket 74a is provided to clamp the edge of a disc 73a which is rigid with the knob 73 and thereby lock the knob 73 in any position in which it has been set. The provision of the gear shift 26a and the differential as well as the variable ratio mechanism 26b makes possible very precise location of the pips marked on the curves as in Fig. 11.

In the interests of accuracy it is desirable to use gears with as little backlash as possible, substantially zero backlash being desired. In order to prevent strain on these gears, the couplings 35 and 40 are provided and disposed in relation to the motor 13 and pulleys 8 and 12 as shown in Figs. 1 and 3. These may be simple slip-friction couplings which permit slippage when the difference between the opposing torque at opposite ends exceeds a predetermined value. These couplings, however, are operable to provide for relative movement between the carriages 5 and 9 which is required when setting the machine, as described above.

In order to stiffen the structure of the tool supporting arm 4 against lateral bending forces, bridges 121 are mounted at each end of the arm 4. These bridges 121 project beyond the arm 4 on both sides thereof and the ends of the bridges are connected by taut cables 122. The arm 4 may be provided with a roller 130 at its under side rotatable on an axis for supporting the outer part of the arm by rolling on the table 33.

*Figs. 5–8*

These figures illustrate the pen carriage 9 and the solenoids 30a and 30b carried thereby.

The carriage 9 is provided on its lower surface with two guide rollers 75 journaled on fixed pins 76 and engaging one side face of the arm 4, and a spring loaded guide roller 77 journaled on a pin 78 carried by an arm 79 which is pivotally mounted on the carriage 9 by means of a pin 80. A spring 81 supported by a depending bracket 81a and adjustable by screw 81b biases the arm 79 to maintain the roller 77 in engagement with the other side face of the tool supporting arm 4 opposite the guide rollers 75. This spring 81 is also effective to hold the carriage with its rollers 75 against the arm 4 so that the carriage moves smoothly outward along it. The carriage 9 is also provided with a pair of supporting rollers 82 turning on horizontal shafts and riding on top of the arm 4.

The pen 31 is received within a cylinder 83 which extends vertically through an aperture 87 in the carriage 9, the aperture being somewhat larger in diameter than the cylinder. The cylinder is pivoted on trunnions 84 carried by a block 84a for rotation about a horizontal axis extending parallel to the arm 4.

A pusher 85 is received within a recess in the carriage 9 which opens into the aperture 87. A spring 86 biases the pusher 85 out of the aperture and into engagement with the cylinder 83. The cylinder 83 thus is biased to its normal or extreme counter-clockwise position, as viewed in Fig. 7, where it abuts against one side of the aperture 87.

The cylinder 83 may be rotated about the trunnions 84 from this normal position by energization of the solenoid 30a the armature 88 of which is thereby moved into engagement with the upper end of the cylinder 83 and the cylinder is rotated a short distance clockwise as viewed in Fig. 7, thereby making a small lateral mark or pip on the curve being drawn by the pen 31. Since the axis of the trunnions 84 is parallel to the length of arm 4, this pip will be drawn transversely of the curve being drawn by the pen.

The mechanism shown may make pips of two different sizes depending upon the energization or deenergization of the solenoid 30b. The transverse movement of the cylinder 83 to make a pip mark is limited by engagement of a lug 90 on the cylinder with an armature 89, Fig. 8, operated by solenoid 30b. In its normal deenergized condition, the armature 89 of the solenoid 30b presents a thick portion 89a opposite the lug 90. The pivotal movement of the cylinder 83 on its trunnions effected by the solenoid 30a is, therefore, limited by the spacing between the lug 90 and the thick portion 89a of the armature 89. When the solenoid 30b is energized its armature 89 is shifted to the left, as viewed in Fig. 8, to bring a reduced portion 89b opposite the lug 90, so that when the solenoid 30a is energized the cylinder 83 can travel farther and make a larger pip in the curve.

As illustrated in Fig. 1, the cam 28a, Fig. 2, has ten notches and the cam 28b, Figs. 2 and 4, has only a single notch. Cam 28a controls the energization of solenoid 30a, while 28b controls the energization of solenoid 30b. Consequently, every tenth pip will be larger than the other nine. The cam 28a is preferably contoured so that the periods of energization of solenoid 30a are very short. This insures that the pips will be simple lateral marks, rather than square-wave-shaped forms which might be produced if the energization of the solenoid continued for an appreciable interval.

If it is desired to move the pen along the chart without marking it, the pen may simply be lifted out of the cylinder 83. Alternatively, a protective sheet may be inserted under the pen during such movement.

While the invention has been described with reference to movement of a pen over a chart, it will be recognized by those skilled in the art that the invention is readily applicable to the movement of other tools generally over other types of work-pieces.

*Figs. 9 and 10*

These figures illustrate the analyzer carriage 5 which moves along the analyzer arm 3. The carriage 5 carries two supporting rollers 91 which roll along the top of the arm 3. The carriage 5 is also provided with two guide rollers 92 rotatable about vertical axles disposed at one side of the arm 3 so as to roll on side face thereof and another guide roller 93 disposed at the opposite face of arm 3 and rotatable on an axle 94 carried on one end of an arm 95 which is pivotally supported at its other end on the carriage 5. A leaf spring 96 mounted on a suitable bracket 97 fixed on the carriage 5 has its free end engaging the arm 95 and biasing the roller 93 against the adjacent face of arm 3. The leaf spring 96 is adjustable by means of screw 96a to take up all the play between the arm 3 and the rollers 92 and 93, so that the carriage 5 rolls smoothly along the arm.

The ends of cable 6 are fixed to pins 98 mounted on the carriage 5.

The carriage 5 at its upper side supports an arbor 99 with its axis vertical and carrying the roller 100 which is received in an eccentric bushing 101 carried in a circular opening 125 in a journal plate 102 attached to the underside of the generating wheel 20. The eccentric bushing 101 may be rotated in the opening to allow minute radial adjustment at roller 100 with respect to the axis of the wheel 20.

On its underside, the arm 3 may be provided with a roller 103 rotatable about an axis extending longitudinally of the arm 3 and rolling on a supporting surface as the arm pivots on the axis of shaft 2. This roller 103 helps in supporting the outer end of the arm.

Fig. 11

This figure illustrates somewhat diagrammatically the type of curves which may be drawn with the apparatus described in Figs. 1–10. The figure shows the pen carrying arm 4 extending over the table 33 on which is mounted a chart 104. Curves 105 have been drawn on the chart by the pen on the carriage 9. The drawing of these curves has been described above in connection with Fig. 1.

Fig. 13

This figure is a bottom plan view of the drafting table 33 and shows the mechanism for shifting the table 33 and the chart 104 with reference to the pivot point of the arms 3 and 4, that is, the axis of shaft 2.

The table 33 is slidably supported on a secondary frame 106, shown as being of hollow rectangular formation, which is in turn slidably supported on the top of the main frame 1. A shaft 107 is journaled in the side members 1a of the frame 1 and extends longitudinally of the table 33. Near each end of shaft 107 there is fixed to the shaft a pinion 108. The pinions 108 cooperate with racks 109 fixed to the underside of the secondary frame 106. The shaft 107 is rotatable by means of a knob 110 fixed to one end thereof and projecting laterally beyond the table 33. It will be seen that rotation of knob 110 turns the shaft 107 and thereby causes the secondary frame 106 and the table 33 to shift crosswise (vertically as seen in Fig. 13) with respect to the main frame 1.

Another shaft 111 is journaled in bearing (not shown) carried by frame 106 and extends across apertures 106a in that frame. Within these apertures the shaft 111 carries pinions 112 which cooperate with racks 113 attached to the underside of the table 33. One end of shaft 111 is provided with an operating knob 114. It may be seen that by rotation of knob 114 the pinions 112 move the racks 113 and thereby the table 33 lengthwise of the main frame 1 (horizontally as seen in Fig. 13) relative to the frame 106.

Fig. 14

This figure illustrates a circle generating mechanism which may be used in place of the cycloid generating mechanism mounted on the main carriage 15. When it is desired to have the pen 31 trace circular curves rather than cycloidal curves, the carriage 15 may be removed and the circle generating mechanism of Fig. 14 inserted in its place. This mechanism includes a link 123 rotatable about a fixed pivot 124 which is journaled in the main frame 1. The other end of link 123 is provided with a circular aperture 125 for receiving the roller 100 carried by the analyzer carriage 5 as in Fig. 9. It may be seen that the center roller 100 always describes a circle about the pivot 124 of Fig. 14. By utilizing this mechanism and by setting the variable ratio drive mechanism 14 to drive the pen carriage 9 a greater distance than the analyzer carriage 5, the apparatus may be made to describe circles of very large radius, even though the center of those circles is located some distance from the apparatus.

Although the apparatus has been described as being used for generating circular and cycloidal curves, it may be used with equal facility to generate a wide variety of other curves. A similar variety of curve generating mechanisms may be used to guide the analyzer carriage 5. For example, it may be made to follow a template or cam surface. In each case the curve traced by the pen on the carriage 9 is homothetic to the curve along which the analyzer carriage 5 moves.

Although no pip-marking cam mechanism is shown in connection with the circle generating mechanism of Fig. 14, it will be readily understood that such cam mechanism could be readily provided. It could also be provided for use with mechanism for generating other forms of curves.

Although the apparatus described herein is principally mechanical, it will readily be recognized by those skilled in the art that many of the mechanical components may be replaced by equivalent electrical components without departing from the teachings of the invention. Other modifications and substitutions of various parts may also be readily made. It is therefore intended that the invention is not to be limited by the specific embodiments disclosed herein, but only by the terms of the appended claims.

What I claim is:

1. Apparatus for describing a curve having a predetermined relation to a given path, comprising a follower supported so as to be capable of movement along said path, an angle analyzer arm supported for pivotal movement thereof about a fixed axis, a radius analyzer carriage mounted on said arm and movable lengthwise thereof radially inwardly and outwardly with respect to said axis, means providing a pivotal connection between said carriage and said follower to provide for movement of said follower along said given path concomitantly with movement of the carriage along said arm and pivotal movement of said arm on said axis so that the angular position of the arm with respect to said axis as an axis of reference and the radial distance of said carriage from said axis along said arm are the polar coordinates of the follower with respect to said axis, an angle repeater arm supported for pivotal movement thereof about said fixed axis, a radius repeater carriage supported on said angle repeater arm for movement thereof lengthwise of said angle repeater arm radially inwardly and outwardly with respect to said axis, a tool supported on said radius repeater carriage so as to be moved along the curve to be described, means operatively connecting said angle repeater arm to said angle analyzer arm for concurrent pivotal movement at the same angular velocity, means operatively connecting said radius repeater carriage to said radius analyzer carriage for concurrent movement along their respective arms, said means operatively connecting said carriages comprising a variable ratio drive mechanism having an element operable to different positions to vary the ratio of said drive mechanism and thereby to vary the ratio between the movements of said analyzer carriage and of said repeater carriage along their respective arms.

2. Apparatus for describing a curve having a predetermined relation to a given path, comprising a follower supported so as to be capable of movement along said path, an angle analyzer arm supported for pivotal movement thereof about a fixed axis, a radius analyzer carriage mounted on said arm and movable lengthwise thereof radially inwardly and outwardly with respect to said axis, means providing a pivotal connection between said carriage and said follower to provide for movement of said follower along said given path concomitantly with movement of the carriage along said arm and pivotal movement of said arm on said axis so that the angular position of the arm with respect to said axis as an axis of reference and the radial distance of said carriage from said axis along said arm are the polar coordinates of the follower with respect to said axis, an angle repeater arm supported for pivotal movement thereof about said fixed axis, a radius repeater carriage supported on said angle repeater arm for movement thereof lengthwise of said angle repeater arm radially inwardly and outwardly with respect to said axis, a tool supported on said radius repeater carriage so as to be moved along the curve to be described, means operatively connecting said angle repeater arm to said angle analyzer arm for concurrent pivotal movement at the same angular velocity, means operatively connecting said radius repeater carriage to said radius analyzer carriage for concurrent movement along their respective arms, a member adapted to support a work piece to be engaged by said tool, means supporting said member for movement of said member transversely of said fixed axis in a given direction and in a direction transverse to said given direction, and means operatively connected to said member and operable to shift said member relative to said fixed axis in said given and transverse directions to determine the position of said member and of said work piece supported thereon relative to said tool.

3. Apparatus for drawing a curve having a predetermined relation to a given curve, comprising a frame, a follower supported by said frame so as to be capable of movement along said given curve, an angle analyzer arm supported by said frame for pivotal movement thereof about a fixed axis, a radius analyzer carriage mounted on said arm and movable lengthwise thereof radially inwardly and outwardly with respect to said axis, means providing a pivotal connection between said carriage and said follower to provide for movement of said follower along said given curve concomitantly with movement of the carriage along said arm and pivotal movement of said arm on said axis so that the angular position of the arm with respect to said axis as an axis of reference and the radial distance of said carriage from said axis along said arm are the polar coordinates of the follower with respect to said axis, an angle repeater arm supported by said frame for pivotal movement thereof about said fixed axis, a radius repeater carriage supported on said angle repeater arm for movement thereof lengthwise of said angle repeater arm radially inwardly and outwardly with respect to said axis, means operatively connecting said angle repeater arm to said angle analyzer arm for concurrent pivotal movement at the same angular velocity, means operatively connecting said radius repeater carriage to said radius analyzer carriage for concurrent movement along their respective arms, a plane table extending parallel to the plane of pivotal movement of said angle repeater arm and adapted to support a sheet on which said curve is to be drawn, a stylus on said radius repeater carriage for tracing the path of a point of said repeater carriage on said sheet, means supporting said plane table on said frame in cooperative relation to said stylus and for movement of said table in a given direction and in a direction transverse to said given direction parallel to said plane of said table, and means operatively connected to said table and to said frame for moving said table relative to said frame selectively in either of said two directions to dispose said stylus in a predetermined relation to said table for drawing said curve.

4. Apparatus for drawing a cycloid and marking on said cycloid points spaced apart by distances defined by predetermined angles of rotation of the generating circle of the cycloid to be drawn, comprising a wheel, means supporting said wheel for rolling movement along a linear path, a follower carried by said wheel at a point on the rolling circumference of the wheel, an angle analyzer arm supported for pivotal movement thereof about a fixed axis, a radius analyzer carriage mounted on said arm and movable lengthwise thereof radially inwardly and outwardly with respect to said axis, means providing a pivotal connection between said carriage and said follower to provide for movement of said follower along a reference cycloid concomitantly with movement of the carriage along said arm and pivotal movement of said arm on said axis, so that the angular position of the arm with respect to said axis as an axis of reference and the radial distance of said carriage from said axis along said arm are the polar coordinates of the follower with respect to said axis, an angle repeater arm supported for pivotal movement thereof about said fixed axis, a radius repeater carriage supported on said angle repeater arm for movement lengthwise of said angle repeater arm radially inwardly and outwardly with respect to said axis, means operatively connecting said angle repeater arm to said angle analyzer arm for concurrent pivotal movement at the same angular velocity, means operatively connecting said radius repeater carriage to said radius analyzer carriage for concurrent movement along their respective arms, a plane table extending parallel to the plane of pivotal movement of said repeater arm and adapted to support in the plane of the table a sheet on which said curve is to be drawn, a stylus supported on said radius repeater carriage adjacent said plane of the table for tracing the path of a point of said repeater carriage on said sheet, a rotary cam, means operatively connecting said cam to said wheel for concurrent rotation therewith, pip marking means supported on said repeater carriage adjacent said plane of the table and operable to mark the sheet adjacent the curve drawn by said stylus, and means actuated by said cam and operatively connected to said pip marking means to operate said pip marking means at predetermined angles of rotation of said wheel.

5. Apparatus for drawing a cycloid and marking on said cycloid points spaced apart by distances defined by predetermined angles of rotation of the generating circle of the cycloid as defined in claim 4 which comprises a variable ratio mechanism operatively connected to said cam and to said wheel and operable to vary the ratio of said movement of said cam and said wheel and thereby to determine the spacing between said marks.

6. Apparatus for drawing a cycloid and marking on said cycloid points spaced apart by distances defined by predetermined angles of rotation of the generating circle of the cycloid as defined in claim 4 in which said means operatively connecting the cam to the wheel includes means for adjusting the position of the cam relative to the wheel.

7. Apparatus for describing a curve having a predetermined relation to a given path, comprising a follower supported so as to be capable of movement along said path, an angle analyzer arm supported for pivotal movement thereof about a fixed axis, a radius analyzer carriage mounted on said arm and movable lengthwise thereof radially inwardly and outwardly with respect to said axis, means providing a pivotal connection between said carriage and said follower to provide for movement of said follower along said given path concomitantly with movement of the carriage along said arm and pivotal movement of said arm on said axis so that the angular position of the arm with respect to said axis as an axis of reference and the radial distance of said carriage from said axis along said arm are the polar coordinates of the follower with respect to said axis, an angle repeater arm supported for pivotal movement thereof about said fixed axis, a radius repeater carriage supported on said angle repeater arm for movement thereof lengthwise of said angle repeater arm radially inwardly and outwardly with respect to said axis, a tool supported on said radius repeater carriage so as to be moved along the curve to be described, means operatively connecting said angle repeater arm to said angle analyzer arm for concurrent pivotal movement at the same angular velocity, means operatively connecting said radius repeater carriage to said radius analyzer carriage for concurrent movement along their respective arms, a motor operatively connected to said means connecting said repeater carriage and said analyzer carriage for driving said carriages in said concurrent movement along the respective arms, and a motor operatively connected to said follower and effective when energized to drive said follower along said path and pivotally to move said analyzer arm and said repeater arm and concomitantly to move said analyzer carriage along said analyzer arm, said motor thereby cooperating with said first motor to drive the repeater carriage along the repeater arm.

8. Apparatus for describing a curve having a predetermined relation to a given path, comprising a follower supported so as to be capable of movement along said path, a bracket supported for pivotal movement thereof on a fixed axis, an angle analyzer arm supported by said bracket for pivotal movement of said arm with said bracket about said fixed axis, a radius analyzer carriage mounted on said arm and movable lengthwise thereof radially inwardly and outwardly with respect to said fixed axis, means providing a pivotal connection between said carriage and said follower to provide for movement of said follower along said given path concomitantly with movement of said carriage along said arm and pivotal movement of said arm on said axis so that the angular position of the arm with respect to said axis as an axis of reference and the radial distance of said carriage from said axis along said arm are the polar coordinates of the follower with respect to said axis, an angle repeater arm supported by said bracket for pivotal movement thereof about said axis, a radius repeater carriage supported on said angle repeater arm for movement thereof lengthwise of said angle repeater arm radially inwardly and outwardly with respect to said axis, a tool supported on said radius repeater carriage so as to be moved along the curve to be described, said angle analyzer arm and said angle repeater arm being supported by said bracket in cantilever relation to said bracket with their lengths extending parallel in planes perpendicular to said axis for concurrent pivotal movement of said arms at the same angular velocity, a plane table extending parallel to said planes of said arms between said arms and adapted to support a work piece for engagement by the tool carried by said radius repeater carriage, and means operatively connecting said radius repeater carriage to said radius analyzer carriage for concurrent movement along their respective arms.

9. Apparatus for describing a curve as defined in claim 8, which comprises motor means supported on said bracket and operatively connected to said carriages and effective when energized to drive the carriages along their respective arms.

10. Apparatus for generating a right cycloid, comprising a fixed frame, a straightedge supported with its length extending horizontally on said frame, a pair of rails extending horizontally across the frame parallel to the straightedge and spaced on opposite sides thereof, a carriage spanning said rails, a plurality of supporting rollers journaled on said carriage for rotation about horizontal axes transverse to said straightedge and supported by said rails for rolling movement thereon concomitantly with movement of said carriage therealong, a first guide roller journaled on said carriage for rotation about a vertical axis and located at one side of said straightedge, a second guide roller rotatable about a vertical axis and located at the opposite side of said straightedge, means supporting said second guide roller on said carriage for movement of said second roller horizontally toward and away from said opposite side of said straightedge, and means connected to said second roller supporting means to bias said second roller into engagement with said opposite side of said straightedge, a wheel journaled on said carriage for rotation about a vertical axis, a traverse cable extending across said frame generally parallel to said straightedge and around the periphery of the wheel, and means operable to rotate the wheel and thereby to roll it along the traverse cable and to move the carriage along the rails on a linear path the direction of which is determined by said straightedge, so that each point on the wheel periphery moves along a path defining a right cycloid.

11. Apparatus for drawing a family of curves intersecting at a common point and each having a predetermined relation to a given curve, comprising a follower supported so as to be capable of movement along said given curve, an angle analyzer arm supported for pivotal movement thereof about a fixed axis, a radius analyzer carriage mounted on said arm and movable lengthwise thereof radially inwardly and outwardly with respect to said axis, means providing a pivotal connection between said carriage and said follower to provide for movement of said follower along said given curve concomitantly with movement of the carriage along said arm and pivotal movement of said arm on said axis, so that the angular position of the arm with respect to said axis as an axis of reference and the radial distance of said pivotal connection of said carriage from said fixed axis along said arm are the polar coordinates of the follower with respect to said axis, an angle repeater arm supported for pivotal movement thereof about said fixed axis, a radius repeater carriage supported on said angle repeater arm for movement thereof lengthwise of said angle repeater arm radially inwardly and outwardly with respect to said axis, means operatively connecting said angle repeater arm to said angle analyzer arm for concurrent pivotal movement at the same angular velocity, means operatively connecting said radius repeater carriage to said radius analyzer carriage for concurrent movement along their respective arms, a plane table extending parallel to the plane of pivotal movement of said repeater arm and adapted to support a sheet in the plane of the table on which said family of curves is to be drawn, a stylus on said radius repeater carriage for tracing the path of a point of the repeater carriage on said sheet, means connected to said carriage connecting means to provide for setting independently the position of the follower along the given curve and the position of the repeater carriage along the repeater arm, and means connected to said table and operable to move the table in the respective directions of the coordinates of the curves so that a family of curves may be drawn through said common point, the position of the follower on the given curve as the stylus passes through said common point being different for each curve of the family.

12. Apparatus for drawing curves as defined in claim 11 which comprises pip marking means carried on said repeater carriage for marking on said curves points representing the intersections of orthogonal curves, and means controlled by the movement of said follower along said given curve and operatively connected to said pip marking means to actuate it periodically.

References Cited in the file of this patent

UNITED STATES PATENTS

| | | |
|---|---|---|
| 331,684 | Compton | Dec. 1, 1885 |
| 1,684,887 | Ridgway | Sept. 18, 1928 |
| 2,317,526 | Hayes | Apr. 27, 1943 |
| 2,437,243 | Curtis | Mar. 9, 1948 |
| 2,553,026 | Williams et al. | May 15, 1951 |
| 2,587,079 | Woods et al. | Feb. 26, 1952 |
| 2,622,328 | Krohn | Dec. 23, 1952 |
| 2,749,205 | Schmitt | June 5, 1956 |

FOREIGN PATENTS

| | | |
|---|---|---|
| 38,024 | Germany | Jan. 3, 1887 |
| 366,024 | France | July 17, 1906 |